United States Patent [19]

Clark et al.

[11] Patent Number: 4,900,759
[45] Date of Patent: Feb. 13, 1990

[54] PHENOLIC FOAMS

[75] Inventors: Robert C. Clark, Somers, Conn.; Dean L. Kavanagh, Longmeadow, Mass.

[73] Assignee: Monsanto Company, St. Louis, Mo.

[21] Appl. No.: 176,463

[22] Filed: Apr. 1, 1988

Related U.S. Application Data

[63] Continuation of Ser. No. 925,515, Oct. 28, 1986, abandoned, which is a continuation of Ser. No. 571,780, Jan. 18, 1984, abandoned, which is a continuation-in-part of Ser. No. 520,363, Aug. 4, 1983, abandoned, which is a continuation of Ser. No. 365,922, Apr. 8, 1982, abandoned, which is a continuation-in-part of Ser. No. 265,508, May 20, 1981, abandoned.

[51] Int. Cl.⁴ .............................................. C08J 9/14
[52] U.S. Cl. ...................................... 521/98; 521/131; 521/181
[58] Field of Search ........................... 521/181, 98, 131

[56] References Cited

U.S. PATENT DOCUMENTS

| | | |
|---|---|---|
| 3,389,094 | 6/1968 | D'Alesandro .................... 521/181 |
| 4,036,793 | 7/1977 | Moss ................................ 521/181 |
| 4,133,931 | 1/1979 | Beale et al. ..................... 521/181 |
| 4,140,842 | 2/1979 | Beale et al. ..................... 521/181 |
| 4,176,216 | 11/1979 | Reid et al. ..................... 521/181 |
| 4,207,400 | 6/1980 | Dahms ............................. 521/181 |
| 4,207,401 | 6/1980 | Dahms ............................. 521/181 |
| 4,216,295 | 8/1980 | Dahms ............................. 521/181 |
| 4,247,413 | 1/1981 | Beale et al. ..................... 521/181 |
| 4,303,758 | 12/1981 | Gusmer ............................ 521/181 |
| 4,444,912 | 4/1984 | Carlson et al. .................. 521/181 |
| 4,478,958 | 10/1984 | Carlson et al. .................. 521/181 |
| 4,539,338 | 10/1984 | Carlson et al. .................. 521/181 |

FOREIGN PATENT DOCUMENTS

| | | |
|---|---|---|
| 890667 | 2/1982 | Belgium ........................... 521/181 |
| 1580565 | 12/1980 | United Kingdom .............. 521/181 |

*Primary Examiner*—Morton Foelak

[57] ABSTRACT

Phenolic foams having a cell structure that is resistant to rupture under pressure and a slow deterioration of thermal insulation value are claimed. These foams can be cured to achieve dimensional stability without substantial adverse affect on their structure.

11 Claims, No Drawings

PHENOLIC FOAMS

CROSS REFERENCE TO RELATED APPLICATIONS

This application is a continuation of application Ser. No. 925,515 filed Oct. 28, 1986, now abandoned, which is a continuation of application Ser. No. 571,780 filed Jan. 18, 1984, now abandoned, which is a continuation-in-part of application Ser. No. 520,363 filed Aug. 4, 1983, now abandoned, which is a continuation of application Ser. No. 365,922, filed Apr. 8, 1982, now abandoned, which is a continuation-in-part of application Ser. No. 265,508, filed May 20, 1981, now abandoned.

BACKGROUND OF THE INVENTION

This invention relates to phenolic foams and particularly to closed-cell foams of a phenol/formaldehyde resin.

The use of foam materials as insulation is an already well-established expedient. However many foam materials that are currently in use have certain inherent problems such as flammability or the production of noxious gases on partial combustion. For this reason there have been a number of attempts to develop a foam with an inbuilt resistance to burning and at the same time high insulation value.

One of the resins explored as having the desired characteristics for producing a flame-resistant foam is a phenolic resin produced by copolymerization of phenol with formaldehyde using a basic catalyst. Such resins are usually called resoles.

The first stage of the production of a phenolic resole is the formation of intermediates with the formula:

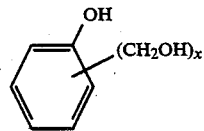

and the ratio of x/phenolic ring gives the approximate combined phenol/formaldehyde (F/P) ratio of the resin.

These intermediates may then react to give structures with the following crosslinking groups:

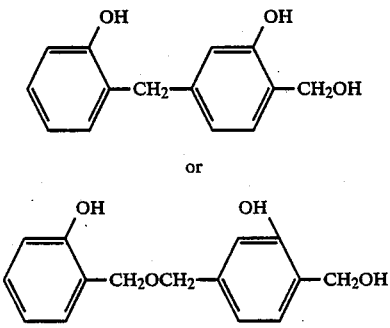

structure II then, at high temperatures, reacting to split off formaldehyde and give crosslinking groups like structure (I). Further reaction leads to chain extension and crosslinking via reaction at other locations on the aromatic ring.

The process of crosslinking and chain extension is not complete at the end of the foaming process but has progressed to such an extent that the foam has hardened and may be cut into pieces. The degree of cure, in the absence of added crosslinking agents, is a function of temperature and, to some extent, the time of exposure to that temperature. Thus foams that are exposed to only low temperatures have a low degree of cure.

Unfortunately the problems of producing a phenolic foam are substantial in that, if good thermal conductivity is to be maintained, substantially all the cells must be and remain closed-cells. This is not easy since the reaction of phenol with formaldehyde generates water as a by-product and this can easily blow open the cells and so diminish the effectiveness of the foam as a thermal barrier.

DISCUSSION OF THE PRIOR ART

While it has been shown possible, as disclosed in British Pat. No. 1,580,565, to produce a closed-cell phenolic foam by keeping the reaction temperature low, this results in foams with a low degree of cure and hence high residual formaldehyde and poor dimensional stability. Such foams are also subject to partial disruption if the cell structure is not strong enough to resist the forces to which the foam is exposed during curing and/or thermal cycling.

In the attempt to generate phenolic foams with a fine uniform cell structure it has long been recognized that the nature of the resole itself is an important factor. In U.S. Pat. No. 3,389,094 the importance of using a resole with a water content of less than 10% is disclosed and in U.S. Pat. No. 2,845,396, for low density foams less than 5% water is stressed. Low water content is desirable because during curing any water present in the foam or generated during cure can vaporize and blow open the cells. This point is made in British Pat. No. 1,580,565. Low water content is also important since it leads to higher viscosity in the resin and better control over the foaming operation.

The art teaches that a closed-cell foam can be made from a resole with the correct rheological properties and methods of adjusting the rheological properties of a resole during foaming by the incorporation of a suitable surfactant as described in U.S. Pat. Nos. 2,933,461; 2,845,396; 3,953,645; 4,140,842 and 4,133,931 amongst others.

Both the viscosity limitations and surfactant usage are reflections of the fact that to achieve adequate closed-cell content it is necessary that the cell walls be strong enough to withstand the stresses encountered when the resin is foamed. As the cells expand, the cell walls must be able to stretch without rupturing. They must in practice demonstrate the well-known Marangoni Effect described for example in "Plastic Foams" by Frisch and Saunders (Marcel Decker Inc. 1972) Part I, pp. 31-35. The Effect refers to the tendency of a surfactant-containing resin film, on stretching, to correct any tendency to depletion of the surfactant concentration on the surface of the film by feeding resin and surfactant into the stretched area and thus restore the film thickness. This "self-healing" effect therefore aids in preventing the fracture of cell walls during the foam formation.

A phenolic foam useful as an insulating material requires a low thermal conductivity and clearly closed-cell foams are much preferred since they minimize heat transfer and loss by gas convection. Additionally it is desirable that the gas filling the closed-cells have as low a thermal conductivity as possible. Gases which have been found useful as blowing agents for phenolic foams include hydrocarbons and halogenated hydrocarbons (U.S. Pat. No. 2,933,461) and fluorocarbons (U.S. Pat. No. 3,389,094).

Other desirable characteristics of phenolic foams are dimensional stability and low residual formaldehyde. Both these characteristics can be provided by heating the foam but as indicated above this leads to foam disruption with the conventional foams of the prior art.

Thus prior art phenolic foams have been produced at temperatures typically below about 80° C. and have been subjected to cure operations at temperature of only up to about 80° C. This produces a foam having a low degree of cure as distinguished from those with a higher degree of cure such as is desirable for many commercial applications.

SUMMARY OF THE INVENTION

Now, however, improvements have been developed to minimize such prior art shortcomings.

Accordingly, it is a principal object of this invention to provide a partially cured phenolic foam that can withstand high temperature cures to give it dimensional stability while at the same time retaining good closed-cell content and good thermal insulation characteristics.

Another object of this invention is to provide a process capable of producing such aforesaid partially cured phenolic foam.

The present invention provides a partially cured resole foam with a density of from 30 to 70 kg/m$^3$ and a closed-cell content of at least 85 percent, said foam being derived from a composition comprising a phenolic resole with a formaldehyde to phenol mole ratio of from 1.2:1 to 2.5:1, a blowing agent having a thermal conductivity less than 0.016 watts/m° C. and a surfactant in sufficient quantity for the resole to exhibit the Marangoni Effect during foaming; said foam characterized in that:

(A) the thermal conductivity of the foam after 100 days is less than 0.020 watts/m° C. and the value of $\Delta k/\Delta lnt$ is less than $0.5 \times 10^{-3}$ where $\Delta k$ in watts/m° C. is $k_{100}$ minus $k_1$ and $\Delta lnt$ in days is $lnt_{100}$ minus $lnt_1$; and (B) the isotropic pressure required to reduce the closed-cell content of the foam by at least 10% is in excess of 1.75 kg/cm$^2$.

The foam is characterized by its closed-cell content of at least 85% and preferably at least 90%. These levels of closed-cell content are substantially retained even after the partially cured foam has been heated to 90° C. or even higher to effect cure. This feature is unusual because, as indicated above, cure temperatures tend to rupture cell walls.

DETAILED DESCRIPTION OF THE INVENTION

FOAM COMPOSITION

The resole from which the foam is prepared is essentially a conventional phenol/formaldehyde resole preferably with less than 10% by weight of any ring-substituted phenolic components such as cresol, xylenol and the like. The F/P mole ratio of the resole is from 1.2:1 to 2.5:1 though ratios at the higher end of this range are not preferred because the excessive amount of formaldehyde prolongs the cure process. However if too small a ratio is used, complete reaction to form the foam may be difficult to achieve. The most preferred F/P ratios are from 1.5 to 2.2:1. As used herein throughout, F/P ratio means the mole ratio of chemically combined formaldehyde to phenol in the resole. Such ratio can be determined by carbon 13 nuclear magnetic resonance ($^{13}$C-NMR). In a specific technique which has been used, $^{13}$C-NMR quantitative spectra were recorded using a JEOL FX-900 spectrometer (supplied by Jeol Co., 235 Birchwood Ave., Cranford, N.J.) at ambient temperature on 50-70% weight percent solutions of resins in methanol solvent. Samples were run in a 10 mm diameter tube with 2% added tetra methyl silane as a chemical shift reference. The spectrometer was equipped with an external lithium 7 isotope lock. The analyzed spectra were the result of 1-5000 accumulations at a tip angle of 90°. Optimized quantitative conditions were employed with gated decoupling (proton decoupling on only during accumulation) and a pulse delay between accumulations of >5 T$_1$ (relaxation time). Integrated spectra were used to calculate combined F/P at an accuracy generally better than 4%.

The density of the foam is from 30 to 70 kg/m$^3$ but preferred foams have densities of from 40 to 60 kg/m$^3$. The density is obtained by cutting a core sample 3.6 cm in diameter and 2.9 cm in length; the core is weighed accurately and the density calculated.

The viscosity of the resole measured at room temperature of 25° C. is from about 50,000 to 1,000,000 cps, with the best results obtained at a viscosity of from 80,000 to 600,000 cps and most preferably 80,000 to 300,000 cps. At such viscosities, the resole can be foamed to produce a substantially closed-cell foam using foaming conditions according to the present invention that are relatively easily controlled. The reactivity of the resole is also very important since if it is too reactive the temperature of the foaming composition rises too high with the result that water vapor uncontrollably blows the foam and control over density and closed-cell content is lost. On the other hand, if reactivity time is too low processing times are long and uneconomical. A suitable test for resole reactivity is set forth hereinafter in Example 13.

A resole is usually produced by the conventional base-catalyzed reaction using an acid subsequent to formation of the resole to neutralize the base and stabilize the resin. This of course results in the production of salt by the reaction of acid and base. The resole may be neutralized using sulfuric acid or carbon dioxide to give large insoluble salt particles which can easily be filtered out before the resole is used to produce a foam. It may also be possible to use unfiltered resins if no settling problems are encountered in the foaming process employed. In general, where salt particles are present, it is preferred that they be very large or very small, that is, substantially larger in diameter than that of the cell or smaller than the thickness of the cell wall. If smaller than the cell wall thickness the particle will not adversely affect the window integrity whereas if larger than a cell the number of cells that are disrupted should be low. Resoles in which neutralization produces a soluble salt are usually not employed because of the water sensitivity such resoles often display in that the insulating properties and dimensional stability of the resulting foam can be adversely affected by ambient humidity. However, resoles containing soluble salts which are not water sensitive, such as the calcium salt of an alkyl or aromatic sulfonic acid, or have low water sensitivity can be used.

A preferred option is the use of the so-called "dispersed-salt" resoles in which the neutralizing acid is oxalic acid and the oxalate salts formed are highly insoluble and in colloidal form with substantially no tendency to settle. These resins and foams made from them are described for example in U.S. Pat. Nos. 4,060,504 and 4,216,295.

The composition from which the foam is prepared comprises a surfactant material in an amount sufficient for the resole to exhibit the Marangoni Effect during foaming and thus have the capacity to produce cells with windows (the membranes between contiguous cells) that remain intact as the cell grows to its final size. The amount of surfactant that can be used varies somewhat with the surfactant but in general it has been observed that closed-cell foams are difficult to achieve with less than 0.5% by weight of surfactant and that over 6.0% by weight produces no advantage and may even be deleterious. The most useful amount of surfactant is found to be from 1 to 5% by weight. All surfactant percentages given are based on resole weight.

The surfactant can be any one of those that have been shown effective with foamable resoles in the past. These include non-ionic surfactants such as polyethers, polyalcohols, particularly the condensation products of alkylene oxides with alkyl phenols, fatty acids, silanes and silicones, fatty acid esters of polyhydroxyl compounds such as sorbitan or sorbitol, polysilyl phosphonates, polydimethylsiloxane and the capped surfactants described in U.S. Pat. Nos. 4,133,931, 4,140,842 and 4,247,413, the disclosures of surfactants of which are incorporated herein by reference. Ionic surfactants such as alkylated quaternary ammonium derivatives may also be used.

The presence of the surfactant as indicated above allows the foam/cure operation to proceed reasonably rapidly without cell structure disruption. However excessive speed, as a result for example of the use of resoles of high reactivity, may still cause disruption to occur. It is advisable therefore to select a resole of moderate reactivity and a foaming catalyst amount that will result in only a moderate exotherm. The combination of resole reactivity and foaming catalyst level can be expressed in terms of a reactivity number defined in Example 13 hereinafter and which can be between about 2 to about 12.

Foaming is catalyzed by an acid and those commonly used include boric acid, sulfuric acid and sulfonic acids such as toluene and xylene sulfonic acids. Other catalytic acids however are known in the art and may be used. The level of catalyst used in the foaming mixture may widely vary depending on the particular resole and catalyst used. Levels between about 0.5 to about 3.0 and preferably between 1.0 to 2.0 weight percent based on the weight of the resole can be used.

The blowing agent used must have a thermal conductivity less than 0.016 and preferably less than 0.014 watts/m° C. Typically this range includes blowing agents such as methylene dichloride, and various chlorofluorocarbons such as monofluorotrichloromethane, difluorodichloromethane, monofluorodichloromethane, difluoromonochloromethane, trifluorotrichloroethane, and tetrafluorodichloroethane. Freon 114, (1,2 dichlorotetrafluoroethane available from DuPont Company under the above trade designation) is particularly preferred. The level of blowing agent used in the foaming mixture is dependent on the molecular weight of the blowing agent and the density of the foam. Levels between about 5 to about 25 and preferably between 10 to 20 weight percent for Freon 114 based on the weight of the resole can be used for foams of about 30 to 70 kg/m$^3$.

In addition to catalyst residues formed in neutralizing the base catalyzing the reaction forming the resole, the resole may comprise latent neutralizing additives to remove traces of residual curing acid and leave a neutral foam. Suitable latent neutralizers are described for example in U.S. Pat. Nos. 4,207,400 and 4,207,401, the disclosures and teachings of latent neutralizers of which are incorporated herein by reference.

In addition to the components described above, the foam can further comprise other additives such as antipunking additives and particulate or fibrous fillers such as glass fibers, talc and the like, to improve the fire safety or physical characteristics of the resulting foam. It may also comprise components added after the resole formation such as lignin materials, urea, or melamine as extenders or formaldehyde scavengers. Hydrated alumina as taught in commonly owned U.S. application Ser. No. 219,165 filed Dec. 22, 1980, now U.S. Pat. No. 4,419,460 issued Dec. 6, 1983, is effective in increasing the closed-cell content and is therefore a desirable component of the foam.

THE FOAMING PROCESS

The process by which closed-cell phenolic foams are produced is very sensitive to variations in conditions and formulations. The basic process described in the prior art entails the extrusion of a foamable mixture under such conditions that the resole foams and hardens at compatible rates. However within these broad parameters it has not heretofore proved possible to obtain a foam that has the outstanding performance of the foams of the invention.

In the production of the foams of the invention the components from which the foam is to be made comprise a resole, a surfactant, an acid catalyst and a blowing agent. These components are selected according to the principles outlined above and are mixed at a temperature and pressure calculated to ensure rapid expansion at the extrusion head. The mixing can be carried out in any mixer device capable of giving effective, fine (less than 10 micron) and uniform dispersion of the blowing agent in the mixture. A suitable mixer device for this stage of the operation is a high shear pin-type mixer with a short residence time such as an Oakes mixer. The preferred blowing agents are conventionally supplied under air or nitrogen pressure to the mixer.

From the mixer the foamable mixture is passed to an extrusion head. Expansion from the head is rapid and results in a stream of foaming material that is deposited on a substrate. The extrusion head may be in the form of a slit so as to lay down a continuous sheet of foam. In a preferred process however the extrusion head is a valved pipe that reciprocates transverse to the direction of extrusion so as to lay down on a moving substrate a continuous ribbon of foam in parallel lines that coalesces as foaming proceeds. In a further preferred feature shaping members provide limitations to the expansion and result in the production of a uniform shaped board of the foamed resin. The shaping members may apply to the surface a suitable facing material though it may be convenient to apply such facing after hardening of the expanded foam.

As foaming proceeds the foam is conventionally held at a constant temperature of about 60° C. This is done by passing the foamed sheet through an oven at that temperature such that on leaving the oven after about twenty minutes it has hardened enough to be cut into board pieces which are then stored at 60° C. for 18 hours. After this the board is in the partially cured state. The term "partially cured" as used herein means foam exposed to at least 60° C. for at least 18 hours. Though other low temperature cure conditions can be used—e.g. longer times at lower temperatures, foams of the invention have at least the degree of partial cure achieved after such 18 hours at 60° C.

After curing for an appropriate period, it is often desirable to apply a facing to the surface. This may comprise cardboard, asphalt/asbestos composites, aluminum foil, plastic vapor barrier or glass fiber sheet material optionally impregnated with resin or asphalt. These facings may improve the surface of the foam and afford some dimensional stability. It should however be noted that cured foams have inherent three-dimensional stability up to about the temperature at which they were cured. Since the foams of the invention can be cured at temperatures in excess of those likely to be encountered in use, any facing selected need not be chosen with the problems of dimensional change in mind.

While the process has been described in terms of the production of a continuous sheet it is of course possible to operate on a batch process and produce a single block of foam by extruding the foamable mixture into a mold.

FOAM PROPERTIES

Since the foam material is primarily useful as an insulating material, it is essential that it provides a good barrier to heat transfer. However it is not sufficient that the fresh foam have good thermal barrier properties; those properties must be retained for a prolonged period after installation.

The thermal insulation characteristics of a closed-cell foam are largely determined by the rate at which heat is transferred through the foam via conduction through the cell skeleton and the gas filling the cells and via radiation through the cell structure. Thus the nature of the gas is a critical element in determining conductivity as is the extent to which it is retained in the cells. It will also be appreciated that stronger and thicker cell windows will be more capable of retaining a more desirable gas composition for a longer period than weaker, thinner windows.

As the foam ages, air diffuses in and blowing agent diffuses out. Since air generally has a much higher thermal conductivity than the blowing agent, the thermal barrier properties are substantially diminished. This is a common experience with most insulating foams and has led to the use of barrier films on the major surfaces to inhibit escape of blowing agent. Such films however lose their utility when punctured.

The decrease in thermal barrier properties takes place gradually but it is found that a useful indicator of long term performance is the thermal conductivity, "k", after 100 days storage at 23° C. and 50 percent relative humidity. If the cell windows in the foam are fractured or very thin, the blowing agent will have been diluted by sufficient air to increase significantly the value of "k".

The "k" after 100 days ($k_{100}$) referred to in this specification is the thermal conductivity one hundred days after the production of the partially cured foams of the invention. The partially cured foams of the invention have a $k_{100}$ of less than 0.020 watts/m° C.

A measure of the rate of increase of thermal conductivity with time of the partially cured foams of the invention can be expressed as the value (known as k-retention) of the expression $\Delta k/\Delta \ln t$ where $\Delta k$ is $k_{100}$ minus $k_1$ and $\Delta \ln t$ is the natural log of $t_{100}$ minus the natural log of $t_1$ where k is the thermal conductivity of a 2.54 cm thick sample measured in watts/m° C. 100 days ($k_{100}$) and one day ($k_1$) after manufacture and t is elapsed time in days. The partially cured foams of the invention have a k-retention value of not more than $0.5 \times 10^{-3}$.

The $k_{100}$ value gives a good indication of the barrier properties of the foam structure but it does not necessarily adequately indicate the strength of that structure, i.e. its ability to withstand internal pressures. This indication is provided by the "burst pressure" which is the isotropic pressure at which the closed-cell content is decreased by at least 10%. Good insulating foams need to be able to withstand high pressures such as are generated during cure or even such thermal cycling as may be experienced in use. In the foams of the invention a burst pressure in excess of 1.75 kg/cm² is required. This, together with the $k_{100}$ value, adequately defines a new type of partially cured foam not provided by the prior art with potential for the production of a high quality, fully cured foam.

The invention is now described with reference to specific compositions which are intended for illustration only. It should not be inferred that they imply any limitation on the scope of the invention.

The closed-cell content was measured by an air pycnometer using the technique described in ASTM D-2856 (Procedure C) to obtain open-cell content, the closed-cell content being 100 minus the open-cell content. The thermal conductivity of the foams was measured using the technique described in ASTM C-518-76 on a sample with a 2.54 cm thickness having at least 20.3 cms of width and length. The top face of the sample was at 32° C. and the bottom at 15.5° C., thereby providing a mean temperature of 24° C. for the entire sample. A heat flow meter thermal conductivity instrument constructed in accordance with such method and available as Rapid-K from Dynatech R/D Co., 99 Erie St., Cambridge, Mass. 02139 was used.

The resole used in each example was dehydrated to below 3% by weight of water and bodied at 50°–60° C. for a time sufficient to provide the desired viscosity which was measured using a Brookfield viscometer Model HBT. Since viscosity variation with temperature is significant, a Brookfield thermocell was used for the resoles of the examples following hereafter which comprised a thermo container along with an SCR controller, Model HT-64, an SC4-27 spindle and an HT-2 sample container. Measurements were made at 25° C. All viscosities given were obtained by this technique.

The burst pressure of the cells of any particular foam was determined by measuring the closed-cell content of a foam sample, then placing that sample in a pressure tube and applying a small incremental isotropic pressure. After being subjected to that pressure for five (5) minutes the closed-cell content was remeasured. The sample was then replaced in the tube and pressurized at a slightly higher isotropic pressure for five (5) minutes before being measured for closed-cell content again. This procedure was repeated at even higher pressures and a graph was plotted of closed-cell content against pressure. It was found that at a characteristic isotropic pressure for each foam the closed-cell content dropped dramatically by at least 10% and continued to drop thereafter. This pressure is called the "burst pressure".

and were tested for density, closed-cell content and thermal conductivity initially ($k_1$) and after 100 days ($k_{100}$). The results are set forth in Table 1.

TABLE 1

| | | | | FOAM PROPERTIES | | |
|---|---|---|---|---|---|---|
| | | | | | Thermal Conduct. (watt/m °C.) | |
| Sample (A–G Invention) | Density (kg/m$^3$) | Initial closed-cell (%) | Burst Pressure (kg/cm$^2$) | $k_1$ (Initial) | $k_{100}$ 100 (—days) | $\frac{\Delta k}{\Delta lnt} \times 10^{3*}$ |
| 1-A | 47.9 | 94.2 | 2.81+ | .0161 | .0164 | .065 |
| 1-B | 47.9 | 90.7 | 2.81+ | .0161 | .0164 | .065 |
| 1-C | 47.9 | 92.4 | 2.81+ | .0161 | .0164 | .065 |
| 1-D | 47.9 | 94.6 | 2.81+ | .0161 | .0164 | .065 |
| 1-E | 47.9 | 95.1 | 2.81+ | .0161 | .0164 | .065 |
| 1-F | 47.9 | 91.1 | 2.81+ | .0161 | .0164 | .065 |
| 1-G | 48.2 | 95.0 | 2.74 | .0161 | .0164 | .065 |

*$\Delta k$ is $k_{100} - k_1$ and $\Delta lnt$ is $lnt_{100} - lnt_1$.

EXAMPLE 1

This Example illustrates the very high burst pressure of foams according to the invention.

The following components were mixed together using a high shear short residence, pin-type mixer supplied by Oakes Machinery Co. and commonly called an "Oakes mixer".

| Resole (1) | F/P ratio 1.89:1 | 96 parts |
|---|---|---|
| | Viscosity at 25° C. | 100,000 cps |
| Blowing Agent | Freon 114 (2) | 16.5 parts |
| Surfactant | DC-193 (3) | 4 parts |
| Foaming Catalyst | (4) | 2.24 parts |
| | All Parts Being by Weight | |

(1) RI-5100 (Monsanto Company) a resole containing a dispersed oxalate salt as a result of the neutralization of the calcium hydroxide catalyst using oxalic acid.

(2) A fluorocarbon (1,2-dichloro-tetrafluoroethane) available from DuPont Company under that description.

(3) A silicone based surfactant available from Dow Corning Company under that designation.

(4) A 2:1 (weight ratio) blend of diethylene glycol and Ultra TX acid (a mixture of toluene and xylene sulfonic acids available from Witco Chemical Company under that trade designation) expressed in terms of acid component content.

The blowing agent was supplied under air pressure and the resulting formulation was passed directly to an extrusion head in the form of a nozzle fitted with a torpedo valve to control the rate of expansion of the foamable mixture from the head.

The temperature of the mixture at the extrusion head was between 40° and 42° C. and the pressure at the valve was kept at 3.74 to 4.42 atmospheres.

The extrusion head was reciprocated in such a way as to lay down a continuous ribbon of the foaming mixture on a moving sheet of Kraft paper. The mixture was deposited in essentially parallel lines forty centimeters in length such that, as foaming occurred, the lines coalesced to form a continuous sheet.

The foam was allowed to stand for about 10 minutes at 60° C. at which time it had hardened sufficiently to be cut using a saw into convenient pieces. Those pieces were than stored at 60° C. for 18 hours.

Samples 1-A through 1-G were taken from different parts of the foam sheet produced by the above process

EXAMPLE 2

This Example illustrates the use of a resole having an F/P ratio of 1.6:1 to produce a foam according to the invention.

The resole was a dispersed salt resole of the same type used in Example 1 but made at the lower F/P ratio. As before the resole was dehydrated and bodied to a viscosity of 106,000 centipoise.

The surfactant, blowing agent and catalyst used were those described in Example 1 and the weight proportions were as follows:

| Resole | 96 parts | |
|---|---|---|
| Blowing Agent | 16.5 parts | |
| Surfactant | 4 parts | |
| Foaming Catalyst | 1.54 parts | (expressed in terms of the acid component of the catalyst) |

The components were mixed, foamed and cured exactly as shown in Example 1 except that the viscosity of the resole was 106,000 cps at 25° C. and the temperature in the extrusion head 49.2° C.

When evaluated in the same manner as the foams produced in Example 1 it was found that the foam had a density of 39.4 kg/m$^3$, an initial closed-cell content of 91.6%, an isotropic burst pressure of 2.46 kg/cm$^2$, a $k_1$ of 0.0181 watts/m° C. and a $k_{100}$ of 0.187 watts/m° C. This gives a k-retention value of $0.13 \times 10^{-3}$ for the expression $k_{100} - k_1 / lnt_{100} - lnt_1$.

EXAMPLES 3–10

Examples 3 to 10 illustrate the sensitivity of the process to variations in components and conditions. The Examples used a resole having a nominal F/P ratio of 2:1 dehydrated to different degrees to give different viscosities. The surfactant and the foaming catalyst were the same but the amount of surfactant and catalyst (expressed as the amount of the Ultra TX acid component) were varied. Additives (based on the total weight of the foamable composition) intended to enhance foam flexibility were used as indicated. For Examples 6, 7, 8 and 9 only, from the extrusion head the foam was cast into 25.4×30.5 ×4.8 cm aluminum foil trays and then placed in a batch oven for 18 hours at 40°–45° C. Other differences from Example 1 are set forth in Table 2.

TABLE 2

COMPARISON OF PROCESS VARIABLES

| Variable Condition | Example 1 | 3 | 4 | 5 | 6 | 7 | 8 | 9 | 10 |
|---|---|---|---|---|---|---|---|---|---|
| Viscosity of Resin (cps at 25° C.) | 100,000 | 190,000 | 100,000 | 86,000 | 93,100 | 23,000 | 74,000 | 74,000 | 30,000 |
| +pph Surfactant | 4 | 4 | 2 | 4 | 4 | 4 | 4 | 4 | 4 |
| Blowing Agent | Freon 114 | Freon 114 | Freon* 11 | Freon 114 | Freon* 11 | Freon* 11 | Freon* 11 | Freon* 11 | Freon 114 |
| % Blowing Agent | 13.7 | 19.4 | 12.9 | 16.5 | 11.8 | 8.2 | 7.5 | 11 | 13 |
| +pph Acid | 2.24 | 2.01 | 1.40 | 2.02 | 1.80 | 1.90 | 2.06 | 2.00 | 2.07 |
| Temperature at Extrusion (°C.) | 40–42 | 52.5 | 54.1 | 48.8 | — | — | — | — | 65.5 |
| Temperature In Mixer (°C.) | 38–40 | 51.5 | 53.1 | 47.0 | 39.0 | 42.0 | 38.0 | 38.0 | — |
| Additive | None | None | None | None | 8% TBEP[1] | 8% EVC[2] | 4% TBEP[1] | 4% TBEP[1] | None |

°A fluorocarbon (trichloro-monofluoromethane) available from DuPont under that designation.
+Based on 100 parts of resin
[1]Tributoxy ethyl phosphate from Monsanto Industrial Chemical Co.
[2]Ethylene vinyl chloride latex as Airflex 4514 from Air Products and Chemicals Inc.

The foams produced by Examples 3 to 10 were characterized in the same manner as those of Example 1 and the results are set forth in Table 3.

TABLE 3

FOAM PROPERTIES

| Example | Density (kg/m$^3$) | Closed-Cell Content (%) | Burst Pressure (kg/cm$^2$) | Thermal Conductivity (watts/m °C.) $k_1$ | $k_{100}$ | $\frac{\Delta k}{\Delta lnt} \times 10^3$ |
|---|---|---|---|---|---|---|
| 3 | 30.0 | (91.0) | 1.41 | .0132 | .0246 | 2.48 |
| 4 | 41.7 | 77.5 | 1.34 | .0158 | .0331 | 3.76 |
| 5 | 38.5 | (90.5) | 1.90 (1) | .0167 | .0331 | 3.56 |
| 6 | 52.9 | (88.0) | 0.84 | .0173 | .0317 | 3.13 |
| 7 | 49.7 | 71.0 | 0.49 | .0158 | .0331 | 3.76 |
| 8 | 70.5 | 60.0 | 0.98 | .0317 | .0317 | — (2) |
| 9 | 51.3 | 60.0 | 0.14 | .0317 | .0317 | — (2) |
| 10 | 46.0 | 94.3 | — | .0167 | .0331 | 3.56 |

(1) This result appears to be anomalous in view of the results obtained with the other comparative samples.

(2) The foams were substantially air-filled from the start.

Examples 1 and 2 above and 12 and 13 below set forth the materials and process conditions which were found to produce the foams of this invention. Changes in the various materials and process conditions from those used in Example 1 to produce the foams results in unsatisfactory foams as is evidenced by the results in Table 3 above. The relationship of these variables is complex and not readily understood at this time. It would appear that when one variable is changed the other variables must be reviewed and changes made as required to obtain the foams of this invention. Those of ordinary skill in the art will appreciate the interaction of these variables upon reading the present specification.

EXAMPLE 11

A sample of a closed-cell resole foam of unknown formulation and unknown cure history but apparently superior performance by comparison with phenolic foams available in commerce, was received from a third party and testing was begun on Aug. 15, 1978. The sample at that prior time was tested by the techniques described in Example 1.

Results were as follows:

| | |
|---|---|
| Density | 35.2 kg/m$^3$ |
| Closed-Cell Content | 97% |
| Thermal Conductivity (as received) | 0.0132 watts/m° C. |
| Thermal Conductivity (after 100 days) | 0.0176 watts/m° C. |
| $\Delta k/\Delta lnt$ | 0.96 $\times$ 10$^{-3}$ |

On Jan. 13, 1981 burst pressure on the foregoing sample was run after the sample was heated for 18 hours at 60° C. to ensure that it had received at least as good a cure as those described in Example 1. The result obtained was as follows:

Burst Pressure: 1.55 kg/cm$^2$.

The above results show that although the foam has a fair retention after 100 days of its low initial thermal conductivity, it did not match that of the invention, as set forth for example, in Table 1 nor was the rate of loss as determined by the k-retention value as low as that of the invention foam of Example 1. Additionally this retention is not alone an adequate indication of utility since a foam should be able to withstand high cure temperatures. The low isotropic burst pressure of the foam indicates that the foam cannot withstand cure without cell rupture. In fact when a foam sample from the same source received one month later and otherwise untreated was heated for 1 hour at 120° C., the closed-cell content after ten minutes in the pycnometer was reduced to 17.5% from 92.2%. This foam is not therefore adequately strong to withstand a curing operation or even the thermal cycling it could expect installed in a conventional built-up roof. By contrast when foam formed according to the conditions recited in Example 1 was subjected to a further 2 hours at 120° C., the closed-cell content was only reduced to 94.4 from 95.5%.

EXAMPLE 12

This Example demonstrates the use of a salt-free resole to produce the foam of the invention.

The resole used was prepared using the same proportions and components as were used to produce the resole used in Example 1. The calcium oxide catalyst in the resole was however neutralized using carbon dioxide in place of oxalic acid. Calcium carbonate was precipitated and filtered off and the salt-free resole was dehydrated to a suitable viscosity and mixed with the blowing agent surfactant and catalyst specified in Example 1.

Two foams were obtained from two different runs and the process and proportions used in the runs were as given in Example 1 except as shown below in Table 4.

TABLE 4
FOAM PRODUCTION

|  | Sample 1 | Sample 2 |
|---|---|---|
| Resole | 96 parts | 96 parts |
| Viscosity (cps) | 75,200 | 82,400 |
| Blowing Agent | 17.2 parts | 17.2 parts |
| Surfactant | 4.0 parts | 4.0 parts |
| Catalyst | 2.01 parts | 1.98 parts |
| Extrusion Head Temperature | 46° C. | — |
| Extrusion Head Pressure (atmosphere) | 3.53 | 4.22 |

The two foams were evaluated in the same manner as the Example 1 foams and the results are set forth in Table 5.

TABLE 5
FOAM PRODUCTION

| Property | Sample 1 | Sample 2 |
|---|---|---|
| Density kg/m$^3$ | 39.57 | 39.73 |
| Closed-Cell Content | 96.1% | 97.7% |
| Thermal Conductivity |  |  |
| initial ($k_1$) | 0.0153 watts/m° C. | 0.0153 watts/m° C. |
| after 100 days ($k_{100}$) | 0.0167 watts/m° C. | 0.0162 watts/m° C. |
| Burst Pressure kg/cm$^2$ | 1.90 | 2.18 |
| $\Delta k/\Delta 1 nt$ (from $k_1$ to $k_{100}$) | $0.30 \times 10^{-3}$ | $0.20 \times 10^{-3}$ |

EXAMPLE 13

This Example further illustrates the use of a resole having a nominal F/P ratio of 2:1 to produce a foam according to the invention. All parts are by weight.

The following components were mixed together using a jacketed, continuous mixer, Model 4MHA available from Oakes Machinery Co., 235 Grant Ave., Islip, N.Y. 11751.

| Resole | F/P ratio 1.93:1 | (1) | 96 parts |
|---|---|---|---|
|  | Viscosity at 25° C. | 263,000 cps |  |
| Blowing Agent | Freon 114 | (2) | 15 parts |
| Surfactant | DC-193 | (3) | 4 parts |
| Foaming Catalyst |  | (4) | 2.2 parts |

(1) The liquid resole contained a dispersed oxalate salt as a result of the neutralization of calcium hydroxide catalyst using oxalic acid. The F/P ratio was obtained by nuclear magnetic resonance (NMR) analysis described previously.

(2) A fluorocarbon (1,2-dichloro-tetrafluoroethane) available from DuPont under that description.

(3) A silicone based surfactant available from Dow Corning Company under that description.

(4) A 2:1 weight ratio blend of diethylene glycol and Ultra TX acid which is a mixture of toluene and xylene sulfonic acids available from Witco Chemical Company under that trade designation, expressed in terms of acid component content.

The blowing agent was held in a bomb-like container and saturated with air by bubbling air at about 15 atmospheres into it for about 4 to 6 hours. This was to promote uniform nucleation of the blowing agent on reduction of the pressure during a subsequent phase of the foaming process.

The resole, stored at about 5° C. to minimize advancement, was initially brought to room temperature (25° C.) and a laboratory test for reactivity performed thereon. This test was run at three acid levels (for Example 1, 1.5 and 1.8% acid as described in (4) above and based on resole weight) in order to measure the sensitivity of the resole reactivity to acid level. 150 grams of the resole and 3 grams of the DC-193 surfactant were charged to a 1 pint paper cup and mixed for one minute with a high speed mixer (720 rpm). 22.5 grams of Freon 113 blowing agent were then added and the contents mixed for an additional minute. The acid catalyst solution of toluene sulfonic acid and diethylene glycol was then added and mixed for an additional 30 seconds. 100 grams of the mixed formulation was quickly charged to a cylindrical cell about 5.7 cms high and 20.3 cms diameter fitted with a thermocouple attached to a recorder. The capped cell was placed in an oven set at 60° C. and the peak temperature and time to reach same noted. The reactivity number, defined as the rate of temperature rise between the oven temperature and the peak temperature reached by the foaming composition, has the dimensions °C./minute and was calculated at 3.2° C./minute. This number is dependent on a number of resole characteristics—e.g. F/P ratio, water component, molecular weight, etc. and can therefore vary widely. Resoles with reactivity numbers of between about 2 to about 12 and preferably between 3 to 7 at a concentration of acid catalyst of 1.5% have been used. If the reactivity number is too high, water is added to the particular resole to reduce it whereas if the reverse is true the acid concentration is adjusted upwardly.

The resole and surfactant were initially mixed together at about 25°–40° C. in a jacketed, paddle mixer for about 30 minutes under an absolute pressure of 5 mm. of mercury to avoid entraining air. The resole and surfactant, foaming catalyst and blowing agent were continuously charged to the Oakes mixer in the foregoing noted ratios through suitable flow metering devices. Turbine meters obtained from Flow Technology Inc., Sacramento, Calif. were used on the Freon and an oval gear meter obtained from Brooks Instrument Division of Emerson Electric was used on the resole-surfactant acid-catalyst streams. The Oakes mixer was operated at about 93 rpm and had tempered water at about 40° C. flowing through its jacket. The charge line carrying the resole was traced with hot water at about the same temperature. The blowing agent and catalyst were metered to the mixer at 25° C. The temperatures of the foam composition entering the mixer was about 30°–40° C. while at the discharge of the mixer it was about 45°–50° C. The pressure in the mixer was 6.8 atmospheres. The temperature increase in the high shear mixer should be minimized to limit reaction therein which tends to foul the mixer. Likewise the pressure in the mixer should be above the vapor pressure of the foaming agent to avoid premature foaming and with the Freon 114 of this Example, such pressure should be kept at between about 3.4–6.8 atmospheres.

The resulting formulation passed from the mixer through a finite length of insulated transfer tube consisting of a 91 cms long by 1.27 cms diameter pipe where foaming commenced, to an extrusion head in the form of a 0.64 cm diameter nozzle just upstream of which was a bladder torpedo-control valve (Tube-O-Matic B-310208 available from Schrider Fluid Power Inc., P.O. Box 1448-71 Woodland St., Manchester, Conn. 06040). This air pressure controlled valve controlled the back pressure in the mixer and delivery tube and the rate of expansion of the foamable mixture issuing from the head. The mass flow rate of the foaming composition through the system was about 430–440 gms/minute.

The temperature of the mixture at the nozzle was 49° C. while the pressure there was 0.68 atmospheres; the pressure at the inlet to the control valve was 3.9 atmospheres whereas the temperature at such inlet was 50.9° C.

The extrusion head was reciprocated through about 55.9 cms in 2–4 seconds in such a way as to lay down a continuous ribbon of the foaming mixture on a sheet of natural Kraft paper 0.254 mm. thick having a weight of 205 kg/1000m$^2$ advancing at the rate of about 24.4 cms/min.

The distance of the nozzle from the moving paper was kept at a minimum to minimize entrainment of air.

The mixture was deposited in essentially parallel lines such that as foaming occurred the lines coalesced to form a continuous sheet. In this regard, the nature of the foam deposited on the moving paper web is a function of the pressure drop across the control valve. If the pressure upstream of the valve is too high a soupy deposit is obtained which results in discernible knit lines at the juncture of the ribbon-like formations issuing from the head which eventually produce undesirable large cells along such knit lines. On the other hand if such pressure is too low shearing of the foam in the control valve and delivery tube occurs which means that the cells are ruptured and the blowing agent escapes. The stream issuing from the nozzle should have the consistency of a froth such that rapid expansion without significant entrapment of air occurs as the composition is deposited on the paper substrate.

Immediately downstream of the extrusion nozzle a protective Kraft paper covering was applied to the upper surface of the advancing foam sheet. Such covering (same characteristics as the paper substrate) passed around a fixed roller about 30.5 cms beyond the nozzle into contact with the rinsing developing foam sheet. The covered foam sheet was then brought into forcible compressive engagement with a succession of six immediately adjacent 3.8 cms diameter freely floating steel rolls interposed across the path of the advancing foam in order to iron out any irregularities in the foam surface and promote good wetting by the foam of the protective upper paper layer. The rollers serve to exert a constant pressure on the advancing foam and were vertically positioned so as to come into contact with about the upper 0.64 cms of thickness. This is important since warping of the foam product can occur in the absence of good adhesion with the top and bottom paper layers brought about by such compressive rolling contact.

The foam sheet covered on its upper and lower faces with the Kraft paper was then passed through a hot air curing tunnel in the form of an oven obtained from Kornylak Co., 400 Heaton St., Hamilton, Ohio, described as a 25 foot Air Film Principle Foam Containment Conveyor. This tunnel oven consisted of a section about 7.6 m long having a succession of five pairs of perforated platens vertically spaced 15.2 cms apart, one of each pair of which was above and below the advancing foam and each of which was about 1.5 m long. A film of hot air controlled at 53° C. issued from the first pair of platens closest to the extrusion nozzle against the paper-covered upper and lower surfaces of the foam. A succession of about eight 3.8 cms diameter, immediately adjacent floating rollers were also in the oven under the first platen for contact with covered upper surface portion of the foam sheet. Air issuing from the remaining platens was kept at temperatures in the range of about 45°–55° C. The residence time of the foam in such oven was about 31 minutes at which time it had been hardened sufficiently to be cut with a saw into convenient pieces. These pieces were then stored at 60° C. for 18 hours.

Periodically (about once every 30 minutes) a thermocouple was inserted into the foam adjacent the extrusion nozzle and allowed to travel down the tunnel to measure the internal temperature of the foam formulation. The peak exotherm temperature was maintained at about 60°–65° C. and was controlled by adjusting the temperature of the hot air in the curing oven and/or the acid curing catalyst concentration in the mixture.

Samples 5-1 through 5—5 were taken from different parts of the foam sheet produced by the foregoing process and were tested as previously described for density, closed-cell content, thermal conductivity initially ($k_1$) and after 100 days ($k_{100}$). The results are set forth in Table 6.

TABLE 6

| | | | EXAMPLE 13 - FOAM PROPERTIES | | | | |
| | | | Initial | | Thermal Conductivity | | |
| Sample | Time[4] (hour) | Density (kg/m$^3$) | Closed Cell (%) | Burst Pressure (kg/cm$^2$) | $k_1$ (watts/m °C.) | $k_{100}$ (watts/m °C.) | k-retention* × 10$^3$ |
| --- | --- | --- | --- | --- | --- | --- | --- |
| 5-1[1] | 1344 | 45.9 | 95.5 | — | 0.0160 | 0.0240 | 1.72 |
| 5-2[1] | 1402 | 46.7 | 97.0 | 3.5 | 0.0164 | 0.0260 | 1.88 |
| 5-3[2] | 1401 | 47.7 | 98.4 | 3.0 | 0.0160 | 0.0171 | 0.19 |
| 5-4[3] | 1355 | 46.5 | 98.4 | 3.5 | 0.0163 | 0.0173 | 0.24 |

TABLE 6-continued

EXAMPLE 13 - FOAM PROPERTIES

| Sample | Time[4] (hour) | Density $(kg/m^3)$ | Initial Closed Cell (%) | Burst Pressure $(kg/cm^2)$ | Thermal Conductivity $k_1$ (watts/m °C.) | $k_{100}$ (watts/m °C.) | k-retention* × $10^3$ |
|---|---|---|---|---|---|---|---|
| 5-5[1] | 1459 | 47.1 | 97.6 | 3.2 | 0.0160 | 0.0168 | 0.19 |

*$k_{100} = k_1/\ln 100 - 1$ - i.e. $\Delta k/\Delta \ln$ (time) for time (t) = 1 to 100
[1]Sample taken at outlet of Kornylak oven and immediately pre-cured @ 60° C. for 18 hours.
[2]Sample taken at outlet of Kornylak oven, held overnight at inside-ambient room temperature conditions, then pre-cured @ 60° C. for 18 hours the next day.
[3]As for (1) except that additional cure @ 90° C. for 2 hours before testing begun.
[4]Of the day when run occurred when sample was taken.

The above data overall illustrates partially cured foam according to the invention which had a density between 30 to 70 kg/m³, a closed-cell content of at least 85%, a thermal conductivity after 100 days less than 0.020 watts/m° C., a k-retention value less than $0.5 \times 10^{-3}$ and an isotropic burst pressure in excess of 1.75 kg/cm². The reason for the high $k_{100}$ and k-retention values for Samples 5-1 and 5-2 is not known.

EXAMPLE 14

This example further illustrates the use of a resole having a nominal F/P ratio of 2:1 and a less than preferred viscosity to produce a foam. All parts are by weight.

The following components were mixed together using a jacketed continuous mixer, Model 4MHA available from Oakes Machinery Co., 235 Grant Ave., Islip, N.Y. 11751:

| Resole | F/P ratio 2.07:1 | (1) | 96 parts |
|---|---|---|---|
|  | Viscosity at 25° C. |  | 77,000 cps |
| Blowing Agent | Freon 114 | (2) | 13 parts |
| Surfactant | DC-193 | (3) | 4 parts |
| Foaming Catalyst |  | (4) | 1.34–1.64 parts |

(1) The liquid resole contained in a dispersed oxalate salt as a result of the neutralization of calcium hydroxide catalyst using oxalic acid. The F/P ratio was obtained by nuclear magnetic resonance (NMR) analysis described previously.

(2) A fluorocarbon (1,2-dichloro-tetrafluoroethane) available from duPont under that description.

(3) A silicone based surfactant available from Dow Corning Company under that description.

(4) A 2:1 weight ratio blend of diethylene glycol and Ultra TX acid which is a mixture of toluene and xylene sulfonic acids available from Witco Chemical Company under that trade designation, expressed in terms of acid component content.

The blowing agent was held in a bomb-like container and saturated with air by bubbling air at about 15 atmospheres into it for about 4 to 6 hours. This was to promote uniform nucleation of the blowing agent on reduction of the pressure during a subsequent phase of the foaming process.

The resole, stored at about 5° C. to minimize advancement, was initially brought to room temperature (25° C.) and a laboratory test for reactivity performed thereon. This test was run at three acid levels (for Example 1, 1.5 and 1.8% acid as described in (4) above and based on resole weight) in order to measure the sensitivity of the resole reactivity to acid level. One hundred fifty grams of the resole and 3 grams of the DC-193 surfactant were charged to a 0.57 litre (1 pint) paper cup and mixed for one minute with a high speed mixer (720 rpm). 22.5 grams of Freon 113 blowing agent were then added and the contents mixed for an additional minute. The acid catalyst solution of toluene sulfonic acid and diethylene glycol was then added and mixed for an additional 30 seconds. 100 grams of the mixed formulation was quickly charged to a cylindrical cell about 5.7 cms high and 20.3 cms diameter fitted with a thermocouple attached to a recorder. The capped cell was placed in an oven set at 60° C. and the peak temperature and time to reach same noted. The reactivity number, defined as the rate of temperature rise between the oven temperature and the peak temperature reached by the foaming composition has the dimensions ° C./minute and was calculated at 8.0° C./minute. This number is dependent on a number of resole characteristics—e.g. F/P ratio, water content, molecular weight, etc. and can therefore vary widely. Resoles with reactivity numbers of between about 2 to about 12 and preferably between 3 to 7 at a concentration of acid catalyst of 1.5% have been used. If the reactivity number is too high, water is added to the particular resole to reduce it whereas if the reverse is true the acid concentration is adjusted upwardly.

The resole and surfactant were initially mixed together at about 25°–40° C. in a jacketed, paddle mixer for about 30 minutes under an absolute pressure of 5 mm. of mercury to avoid entraining air. The resole and surfactant, foaming catalyst and blowing agent were continuously charged to the Oakes mixer in the foregoing noted ratios through suitable flow metering devices. Turbine meters obtained from Flow Technology Inc., Sacramento, Calif. were used on the Freon and an oval gear meter obtained from Brooks Instrument Division of Emerson Electric was used on the resole-surfactant acid-catalyst streams. The Oakes mixer was operated at about 115 rpm and had tempered water at about 40° C. flowing through its jacket. The charge line carrying the resole was traced with hot water at about the same temperature. The blowing agent and catalyst were metered to the mixer at 25° C. The temperatures of the foam composition entering the mixer was about 30°–40° C. while at the discharge of the mixer it was about 45°–50° C. The pressure in the mixer was 4.1 atmospheres. The temperature increase in the high shear mixer should be minimized to limit reaction therein which tends to foul the mixer. Likewise the pressure in the mixer should be above the vapor pressure of the foaming agent to avoid premature foaming and with the Freon 114 of this example, such pressure should be kept at between about 3.4–6.8 atmospheres.

The resulting formulation passed from the mixer through a finite length of insulated transfer tube consisting of a 91 cms long by 1.27 cms diameter pipe where foaming commenced, to an extrusion head in the form of a 0.64 cm diameter nozzle just upstream of which was a bladder torpedo-control valve (Tube-O-Matic Valve B-310208 available from Schrider Fluid Power Inc., P.O. Box 1448-71 Woodland St., Manchester, Conn. 06040). This air pressure controlled valve controlled the back pressure in the mixer and delivery tube and the rate of expansion of the foamable mixture issuing from the head. The mass flow rate of the foaming composition through the system was about 420 gms/minute.

The temperature of the mixture at the nozzle was about 42° C. while the pressure there was about 0.5 atmospheres; the pressure at the inlet to the control valve was about 1.5 atmospheres whereas the temperature at such inlet was about 44° C.

The extrusion head was reciprocated through about 42 cms in 2–4 seconds in such a way as to lay down a continuous ribbon of the foaming mixture on a sheet of natural Kraft paper 0.254 mm. thick having a weight of 205 kg/1000m$^2$ advancing at the rate of about 20–30 cms/min.

The distance of the nozzle from the moving paper was kept at a minimum to minimize entrainment of air.

The mixture was deposited in essentially parallel lines such that as foaming occurred the lines coalesced to form a continuous sheet. In this regard, the nature of the foam deposited on the moving paper web is a function of the pressure drop across the control valve. If the pressure upstream of the valve is too high a soupy deposit is obtained which results in discernible knit lines at the juncture of the ribbon-like formations issuing from the head which eventually produce undesirable large cells along such knit lines. On the other hand if such pressure is too low shearing of the foam in the control valve and delivery tube occurs which means that the cells are ruptured and the blowing agent escapes. The stream issuing from the nozzle should have the consistency of a froth such that rapid expansion without significant entrapment of air occurs as the composition is deposited on the paper substrate.

Immediately downstream of the extrusion nozzle a protective Kraft paper covering was applied to the upper surface of the advancing foam sheet. Such covering (same characteristics as the paper substrate) passed around a fixed roller about 30.5 cms beyond the nozzle into contact with the rising developing foam sheet. The covered foam sheet was then brought into forcible compressive engagement with a succession of six immediately adjacent 3.8 cms diameter freely floating steel rolls interposed across the path of the advancing foam in order to iron out any irregularities in the foam surface and promote good wetting by the foam of the protective upper paper layer. The rollers serve to exert a constant pressure on the advancing foam and were vertically positioned so as to come into contact with about the upper 0.64 cms of thickness. This is important since warping of the foam product can occur in the absence of good adhesion with the top and bottom paper layers brought about by such compressive rolling contact.

The foam sheet covered on its upper and lower faces with the Kraft paper was then passed through a hot air curing tunnel in the form of an oven obtained from Kornylak Co., 400 Heaton St., Hamilton, Ohio, described as a 25 foot Air Film Principle Foam Containment Conveyor. This tunnel oven consisted of a section about 7.6 m long having a succession of five pairs of perforated platens vertically spaced 15.2 cms apart, one of each pair of which was above and below the advancing foam and each of which was about 1.5 m long. A film of hot air controlled at 53° C. issued from the first pair of platens closest to the extrusion nozzle against the paper-covered upper and lower surfaces of the foam. A succession of about eight 3.8 cms diameter, immediately adjacent floating rollers were also in the oven under the first platen for contact with covered upper surface portion of the foam sheet. Air issuing from the remaining platens was kept at temperatures in the range of about 60° C. The residence time of the foam in such oven varied from 20–50 minutes at which time it had been hardened sufficiently to be cut with a saw into convenient pieces. These pieces were then stored at 60° C. for either 18 hours, or 4 hours, or they were not heated at all.

Periodically (about once every 30 minutes) a thermocouple was inserted into the foam adjacent the extrusion nozzle and allowed to travel down the tunnel to measure the internal temperature of the foam formulation. The peak exotherm temperatures was maintained at about 60°–70° C. and was controlled by adjusting the temperature of the hot air in the curing oven and/or the acid curing catalyst concentration in the mixture.

Runs 1 through 26 were taken at different times from the foam sheet produced by the foregoing process and were tested as previously described for density, closed-cell content and thermal conductivity after 100 days. The results are set forth in Table 7.

All samples were made under nearly identical conditions. The major difference being the amount of batch oven cure. As can be seen from the data, it is extremely difficult to control foam properties utilizing this viscosity resin. Although 10 of the 26 samples had greater than 85% closed cell, none of those measured had a k retention value stability, $\delta k/\delta$ ln t, less than $0.5 \times 10^{-3}$. The cell structure was marginally effective.

TABLE 7

| Sample | Density(Kg/m$^3$) | Closed Cell % | k Retention Value $\delta k/\delta$ 1nt |
|---|---|---|---|
| 14-1 | 49.5 | 67.5 | |
| 14-2 | 50.4 | 67.4 | |
| 14-3 | 57.5 | 80.7 | |
| 14-4 | 51.5 | 88.0 | |
| 14-5 | 52.7 | 86.4 | $1.56 \times 10^{-3}$ |
| 14-6 | 56.0 | 57.1 | |
| 14-7 | 51.9 | 72.1 | |
| 14-8 | 54.1 | 88.8 | |
| 14-9 | 54.6 | 79.3 | |
| 14-10 | 54.1 | 86.9 | |
| 14-11 | 46.7 | 67.7 | |
| 14-12 | 46.6 | 8.2 | |
| 14-13 | 53.8 | 89.6 | $1.37 \times 10^{-3}$ |
| 14-14 | 50.4 | 93.7 | $0.66 \times 10^{-3}$ |
| 14-15 | 52.3 | 91.8 | |
| 14-16 | 53.8 | 91.6 | |
| 14-17 | 47.5 | 3.7 | |
| 14-18 | 47.7 | 15.6 | |
| 14-19 | 48.8 | 96.0 | $0.66 \times 10^{-3}$ |
| 14-20 | 43.2 | 18.0 | |
| 14-21 | 45.4 | 39.9 | |
| 14-22 | 45.6 | 42.7 | |
| 14-23 | 41.6 | 13.6 | |
| 14-24 | 33.6 | 2.7 | |
| 14-25 | 37.9 | 15.6 | |
| 14-26 | 42.9 | 92.2 | $0.75 \times 10^{-3}$ |

EXAMPLE 15

This example illustrates the use of a high viscosity resole having a nominal F/P ratio of 2:1 to produce a foam according to the invention. All parts are by weight.

The following components were mixed together using a jacketed, continuous mixer, Model 4MHA available from Oakes Machinery Co., 235 Grant Ave. Islip, N.Y. 11751.

| Resole | F/P ratio 1.93:1 | (1) | 96 parts |
| --- | --- | --- | --- |
| | Viscosity at 25° C. | | 472,000 cps |
| Blowing Agent | Freon 114 | (2) | 13.8 parts |
| Surfactant | DC-193 | (3) | 4 parts |
| Foaming Catalyst | | (4) | 1.3 parts |

(1) The liquid resole contained a dispersed oxalate salt as a result of the neutralization of calcium hydroxide catalyst using oxalic acid. The F/P ratio was obtained by nuclear magnetic resonance (NMR) analysis described previously.

(2) A fluorocarbon (1,2-dichloro-tetrafluoroethane) available from duPont under that description.

(3) A silicone based surfactant available from Dow Corning Company under that description.

(4) A 2:1 weight ratio blend of diethylene glycol and Ultra TX acid which is a mixture of toluene and xylene sulfonic acids available from Witco Chemical Company under that trade designation, expressed in terms of acid component content.

The blowing agent was held in a bomb-like container and saturated with air by bubbling air at about 15 atmospheres into it for about 4 to 6 hours. This was to promote uniform nucleation of the blowing agent on reduction of the pressure during a subsequent phase of the foaming process.

The resole, stored at about 5° C. to minimize advancement, was initially brought to room temperature (25° C.) and a laboratory test for reactivity performed thereon. This test was run at three acid levels (for Example 1, 1.5 and 1.8% acid as described in (4) above and based on resole weight) in order to measure the sensitivity of the resole reactivity to acid level. 150 grams of the resole and 3 grams of the DC-193 surfactant were charged to a 0.57 litre (1 pint) paper cup and mixed for one minute with a high speed mixer (720 rpm). 22.5 grams of Freon 113 blowing agent were then added and the contents mixed for an additional minute. The acid catalyst solution of toluene sulfonic acid and diethylene glycol was then added and mixed for an additional 30 seconds. 100 grams of the mixed formulation was quickly charged to a cylindrical cell about 5.7 cms high and 20.3 cms diameter fitted with a thermocouple attached to a recorder. The capped cell was placed in an oven set at 60° C. and the peak temperature and time to reach same noted. The reactivity number, defined as the rate of temperature rise between the oven temperature and the peak temperature reached by the foaming composition has the dimensions ° C./minute and was calculated at 6.4° C./minute. This number is dependent on a number of resole characteristics—e.g. F/P ratio, water content, molecular weight, etc. and can therefore vary widely. Resoles with reactivity numbers of between about 12 and preferably between 3 to 7 at a concentration of acid catalyst of 1.5% have been used. If the reactivity number is too high, water is added to the particular resole to reduce it whereas if the reverse is true the acid concentration is adjusted upwardly.

The resole and surfactant were initially mixed together at about 25°-40° C. in a jacketed, paddle mixer for about 30 minutes under an absolute pressure of 5 mm. of mercury to avoid entraining air. The resole and surfactant, foaming catalyst and blowing agent were continuously charged to the Oakes mixer in the foregoing noted ratios through suitable flow metering devices. Turbine meters obtained from Flow Technology Inc., Sacramento, Calif. were used on the Freon and an oval gear meter obtained from Brooks Instrument Division of Emerson Electric was used on the resole-surfactant acid-catalyst streams. The Oakes mixer was operated at about 130 rpm and had tempered water at about 40° C. flowing through its jacket. The charge line carrying the resole was traced with hot water at about the same temperature. The blowing agent and catalyst were metered to the mixer at 25° C. The temperatures of the foam composition entering the mixer was about 30°-40° C. while at the discharge of the mixer it was about 50° C. The pressure in the mixer was 9.0 atmospheres. The temperature increase in the high shear mixer should be minimized to limit reaction therein which tends to foul the mixer. Likewise the pressure in the mixer should be above the vapor pressure of the foaming agent to avoid premature foaming and with the Freon 114 of this example, such pressure should be kept above 5.0 atmospheres.

The resulting formulation passed from the mixer through a finite length of insulated transfer tube consisting of 91 cms long by 1.27 cms diameter pipe where foaming commenced, to an extrusion head in the form of a 0.64 cm diameter nozzle just upstream of which was a bladder torpedo-control valve (Tube-O-Matic Valve B-310208 available from Schrider Fluid Power Inc., P.O. Box 1448-71 Woodland St., Manchester, Conn 06040). This air pressure controlled valve controlled the back pressure in the mixer and delivery tube and the rate of expansion of the foamable mixture issuing from the head. The mass flow rate of the foaming composition through the system was about 420 gms/minute.

The temperature of the mixture at the nozzle was 57° C. while the pressure there was 1.4 atmospheres; the pressure at the inlet to the control valve was 3.5 atmospheres whereas the temperature at such inlet was 57° C.

The extrusion head was reciprocated through about 25 cms in 3 seconds in such a way as to lay down a continuous ribbon of the foaming mixture on a sheet of cardboard advancing at the rate of about 25.4 cms/min.

The distance of the nozzle from the moving cardboard was kept at a minimum to minimize entrainment of air.

The mixture was deposited in essentially parallel lines such that as foaming occurred the lines coalesced to form a continuous sheet. In this regard, the nature of the foam deposited on the moving cardboard is a function of the pressure drop across the control valve. If the pressure upstream of the valve is too high a soupy deposit is obtained which results in discernible knit lines at the juncture of the ribbon-like formations issuing from the head which eventually produce undesirable large cells along such knit lines. On the other hand if such pressure is too low shearing of the foam in the control valve and delivery tube occurs which means that the cells are ruptured and the blowing agent escapes. The stream issuing from the nozzle should have the consistency of a froth such that rapid expansion without significant entrapment of air occurs as the composition is deposited on the cardboard substrate.

The foam deposited on the cardboard was placed in a hot air circulatory oven for 16 hours at 60° C. After 16 hours the closed cell content was measured.

|           | Density | Closed Cell Content |
|-----------|---------|---------------------|
| Sample 15-1 | 47.5  | 89.9%               |
| 15-2      | 40.3    | 87.2%               |

EXAMPLE 16

This example further illustrates the use of a high viscosity, resole having a nominal F/P ratio of 1.6:1, to produce a foam according to the invention. All parts are by weight.

The following components were mixed together using a jacketed, continuous mixer, Model 4MHA available from Oakes Machinery Co., 235 Grant Ave., Islip, N.Y. 11751.

| Resole | F/P ratio 1.6:1 | (1) | 96 parts |
|--------|------------------|-----|----------|
|        | Viscosity at 25° C. |  | 230,000 cps |
| Blowing Agent | Freon 114 | (2) | 13.6 parts |
| Surfactant | DC-193 | (3) | 4 parts |
| Foaming Catalyst |  | (4) | 2.1 parts |

(1) The liquid resole contained a soluble sodium salt as a result of the neutralization of sodium hydroxide catalyst using Ultra TX acid(5). The F/P ratio was obtained by nuclear magnetic resonance (NMR) analysis described previously.

(2) A fluorocarbon (1,2-dichloro-tetrafluoroethane) available from duPont under that description.

(3) A silicone based surfactant available from Dow Corning Company under that description.

(4) A 2:1 weight ratio blend of diethylene glycol and Ultra TX acid which is a mixture of toluene and xylene sulfonic acids available from Witco Chemical Company under that trade designation, expressed in terms of acid component content.

(5) Ultra TX is a mixture of toluene and xylene sulfonic acids available from Witco Chemical Co.

The blowing agent was held in a bomb-like container and saturated with air by bubbling air at about 10 atmospheres into it for about 4 to 6 hours. This was to promote uniform nucleation of the blowing agent on reduction of the pressure during a subsequent phase of the foaming process.

The resole, stored at about 5° C. to minimize advancement, was initially brought to room temperature (25° C.) and a laboratory test for reactivity performed thereon. This test was run at three acid levels (for Example 1, 1.5 and 1.8% acid as described in (4) above and based on resole weight) in order to measure the sensitivity of the resole reactivity to acid level. 150 grams of the resole and 3 grams of the DC-193 surfactant were charged to a 0.57 litre (1 pint) paper cup and mixed for one minute with a high speed mixer (720 rpm). 22.5 grams of Freon 113 blowing agent were then added and the contents mixed for an additional minute. The acid catalyst solution of toluene sulfonic acid and diethylene glycol was then added and mixed for an additional 30 seconds. 100 grams of the mixed formulation was quickly charged to a cylindrical cell about 5.7 cms high and 20.3 cms diameter fitted with a thermocouple attached to a recorder. The capped cell was placed in an oven set at 60° C. and the peak temperature and time to reach same noted. The reactivity number, defined as the rate of temperature rise between the oven temperature and the peak temperature reached by the foaming composition, has the dimensions ° C./minute and was calculated at 19.7° C./minute. This number is dependent on a number of resole characteristics—e.g. F/P ratio, water content, molecular weight, etc. and can therefore vary widely. Resoles of this type with reactivity numbers of between about 5 to about 45 and preferably between 15 to 25 at a concentration of acid catalyst of 1.5% have been used. If the reactivity number is too high, water is added to the particular resole to reduce it whereas if the reverse is true the acid concentration is adjusted upwardly.

The resole and surfactant were initially mixed together at about 25°-40° C. in a jacketed, paddle mixer for about 30 minutes under an absolute pressure of 5 mm. of mercury to avoid entraining air. The resole and surfactant, foaming catalyst and blowing agent were continuously charged to the Oakes mixer in the foregoing noted ratios through suitable flow metering devices. Turbine meters obtained from Flow Technology Inc., Sacramento, Calif. were used on the Freon and an oval gear meter obtained from Brooks Instrument Division of Emerson Electric was used on the resole-surfactant acid-catalyst streams. The Oakes mixer was operated at about 180 rpm and had tempered water at about 40° C. flowing through its jacket. The charge line carrying the resole was traced with hot water at about the same temperature. The blowing agent and catalyst were metered to the mixer at 25° C. The temperatures of the foam composition entering the mixer was about 30°-40° C. while at the discharge of the mixer it was about 52° C. The pressure in the mixer was 8 atmospheres. The temperature increase in the high shear mixer should be minimized to limit reaction therein which tends to foul the mixer. Likewise the pressure in the mixer should be above the vapor pressure of the foaming agent to avoid premature foaming and with the Freon 114 of this example, such pressure should be kept at between about 6-10 atmospheres.

The resulting formulation passed from the mixer through a finite length of insulated transfer tube consisting of a 91 cms long by 1.27 cms diameter pipe where foaming commenced, to an extrusion head in the form of a 0.64 cm diameter nozzle just upstream of which was a bladder torpedo-control valve (Tube-O-Matic Valve B-310208 available from Schrider Fluid Power Inc., P.O. Box 1448-71 Woodland St., Manchester, Conn 06040). This air pressure controlled valve controlled the back pressure in the mixer and delivery tube and the rate of expansion of the foamable mixture issuing from the head. The mass flow rate of the foaming composition through the system was about 720 gms/minute.

The temperature of the mixture at the nozzle was 53° C. while the pressure there was about 0.5 atmospheres; the pressure at the inlet to the control valve was 3.4 atmospheres whereas the temperature at such inlet was about 54° C.

The extrusion head was reciprocated through about 110 cms in 4-6 seconds in such a way as to lay down a continuous ribbon of the foaming mixture on a sheet of natural Kraft paper 0.254 mm. thick having a weight of 205 kg/1000m$^2$ advancing at the rate of about 29 cms/min.

The distance of the nozzle from the moving paper was kept at a minimum to minimize entrainment of air.

The mixture was deposited in essentially parallel lines such that as foaming occurred the lines coalesced to form a continuous sheet. In this regard, the nature of the foam deposited on the moving paper web is a function of the pressure drop across the control valve. If the pressure upstream of the valve is too high a soupy deposit is obtained which results in discernible knit lines at the juncture of the ribbon-like formations issuing from the head which eventually produce undesirable large cells along such knit lines. On the other hand if such pressure is too low shearing of the foam in the control valve and delivery tube occurs which means that the cells are ruptured and the blowing agent escapes. The stream issuing from the nozzle should have the consistency of a froth such that rapid expansion without significant entrapment of air occurs as the composition is deposited on the paper substrate.

Immediately downstream of the extrusion nozzle a protective Kraft paper covering was applied to the upper surface of the advancing foam sheet. Such covering (same characteristics as the paper substrate) passed around a fixed roller about 30.5 cms beyond the nozzle into contact with the rising developing foam sheet. The covered foam sheet was then brought into forcible compressive engagement with a succession of six immediately adjacent 3.8 cms diameter freely floating steel rolls interposed across the path of the advancing foam in order to iron out any irregularities in the foam surface and promote good wetting by the foam of the protective upper paper layer. The rollers serve to exert a constant pressure on the advancing foam and were vertically positioned so as to come into contact with about the upper 0.64 cms of thickness. This is important since warping of the foam product can occur in the absence of good adhesion with the top and bottom paper layers brought about by such compressive rolling contact.

The foam sheet covered on its upper and lower faces with the Kraft paper was then passed through a hot air curing tunnel in the form of an oven obtained from Kornylak Co., 400 Heaton St., Hamilton, Ohio, described as a 25 foot Air Film Principle Foam Containment Conveyor. This tunnel oven consisted of a section about 7.6 m long having a succession of five pairs of perforated platens vertically spaced 15.2 cms apart, one of each pair of which was above and below the advancing foam and each of which was about 1.5 m long. A film of hot air controlled at 53° C. issued from the first pair of platens closest to the extrusion nozzle against the paper-covered upper and lower surfaces of the foam. A succession of about eight 3.8 cms diameter, immediately adjacent floating rollers were also in the oven under the first platen for contact with covered upper surface portion of the foam sheet. Air issuing from the remaining platens was kept at temperatures in the range of about 55°–65° C. The residence time of the foam in such oven was about 21 minutes at which time it had been hardened sufficiently to be cut with a saw into convenient pieces. These pieces were then stored at 60° C. for 18 hours.

Periodically (about once every 30 minutes) a thermocouple was inserted into the foam adjacent the extrusion nozzle and allowed to travel down the tunnel to measure the internal temperature of the foam formulation. The peak exotherm temperature was maintained at about 65°–70° C. and was controlled by adjusting the temperature of the hot air in the curing oven and/or the acid curing catalyst concentration in the mixture.

Samples 16-1 through 16-3 were taken from different parts of the foam sheet produced by the foregoing process and were tested as previously described for density, closed-cell content, thermal conductivity initially (k) and after 100 days ($k_{100}$). The results are set forth in Table 8.

TABLE 8

EXAMPLE 16 - FOAM PROPERTIES

| Sample (1) | Time (2) (hour) | Density (kg/m³) | Initial Closed Cell (%) | Burst Pressure (kg/cm²) | Thermal Conductivity (3) Estimate $k_1$ (watts/m °C.) | $k_{100}$ (watts/m °C.) | k-retention* × 10³ |
|---|---|---|---|---|---|---|---|
| 16-1 | 1407 | 41.3 | 97.4 | — | .0163 | .0169 | 0.13 |
| 16-2 | 1437 | 42.05 | 96.5 | 2.9 | .0160 | .0166 | 0.13 |
| 16-3 | 1534 | 41.7 | 98.3 | 2.9 | .0157 | .0163 | 0.13 |

*$k_{100} - k_1/\ln 100 - \ln 1$ - i.e. $\Delta k/\Delta \ln$ for time (t) = 1 to 100
(1) Sample taken at outlet of Kornylak oven and immediately pre-cured @ 60° C. for 18 hours before testing begun.
(2) Of the day when run occurred when sample was taken.
(3) These samples were aged at 140° F. instead of 73° F. Because of increases in diffusion, the aging rate at 140° F. is known to be 3 times the rate at 73° F. The data @ 140° F. follows:

| | $k_1$ | $k_{100}$ @ 140° F. | $k_{100}$ Estimate @ 73° F. |
|---|---|---|---|
| 16-1 | 0.0163 | 0.0180 | 0.0169 |
| 16-2 | 0.0160 | 0.0177 | 0.0166 |
| 16-3 | 0.0157 | 0.0176 | 0.0163 |

The above data overall illustrates partially cured foam according to the invention which had a density between 30 to 70 kg/m³, a closed-cell content of at least 85%, a thermal conductivity after 100 days less than 0.020 watts/m° C., a k-retention value less than $0.5 \times 10^{-3}$ and an isotropic burst pressure in excess of 1.75 kg/cm². Even the k retention value aged at 140° F. is less than $0.5 \times 10^{-3}$.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

We claim:

1. A phenolic foam derived from a composition comprising a phenolic resole with a formaldehyde to phenol mole ratio of from 1.2:1 to 2.5:1, a blowing agent having a thermal conductivity of less than 0.016 watts/m° C. and from 0.5 to 6 wt.% of a surfactant based on the weight of the resole, said foam possessing:
   a. a density of from 30 to 70 kg/m³, and a closed-cell content of at least 85% as measured by an air pycnometer according to ASTM test method D-2856 (Procedure C);

b. a thermal conductivity after 100 days at 23° C. and 50% relative humidity of less than 0.02 watts/m° C., and a value of $\Delta k/\Delta \ln t$ of less than $0.5 \times 10^{-3}$ where $\Delta k$ in watts/m° C. is $k_{100}$ minus $k_1$ and $\Delta \ln t$ in days is $\ln t_{100}$ minus $\ln t_1$;

c. an isotropic pressure, required to reduce the closed-cell content of the foam by at least 10 percent, in excess of 1.75 kg/cm²; and d. said foam being hardened and having a degree of cure which is at least substantially equal to the degree of cure achieved by heating the hardened foam to a temperature of 60° C. for at least 18 hours.

2. A partially cured foam according to claim 1 in which the resole used to prepare the foam has a formaldehyde to phenol mole ratio of from 1.5 to 2.2.

3. A partially cured foam according to claim 1 in which the blowing agent is selected from the group consisting of methylene chloride and chlorofluorocarbons.

4. A partially cured foam according to claim 1 in which the foam is prepared from a resole in which less than 10% of the phenolic components are ring substituted.

5. A partially cured foam according to claim 1 which comprises from 1.0 to 5.0% by weight of a nonionic surfactant, based on the resole weight.

6. A foam according to any one of claims 1 and 2 to 5 in which the resole used to prepare the foam comprises a dispersed salt component.

7. A foam according to any one of claims 1 and 2 to 5 which has been prepared from a salt-free resole.

8. A laminate comprising a resole foam according to either one of claims 1 and 7.

9. The foam of claim 1, wherein the resole reactivity number of the phenolic resole is about 2 to about 45 at an acid catalyst concentration of 1.5%.

10. The foam of claim 10, wherein the resole reactivity number is about 3 to 7 at an acid catalyst concentration of 1.5%.

11. A phenolic foam derived from a composition comprising a dispersed salt resole with a viscosity of from 80,000 to 600,000 centipoise at 25° C. and a formaldehyde to phenol mole ratio of 1.5:1 to 2.2:1; from 1.0 to 5.0% by weight, based on the resole weight, of a nonionic surfactant; and a blowing agent with a thermal conductivity of less than 0.014 watts/m° C.; the foam possessing:

a. a density of from 40 to 60 kg/m³ and a closed-cell content of at least 90% as measured by an air pycnometer according to ASTM test method D-2856 (Procedure C);

b. a thermal conductivity after 100 days of less than 0.02 watts/m° C. and a value of $\Delta k/\Delta \ln t$ of less than $0.5 \times 10^{-3}$ where $\Delta k$ in watts/m° C. is $k_{100}$ minus $k_1$ and $\Delta \ln t$ in days is $\ln t_{100}$ minus $\ln t_1$;

c. a pressure, required to reduce the closed-cell content of the foam by at least 10 percent, in excess of 1.75 kg/cm²; and d. said foam being hardened and having a degree of cure which is at least substantially equal to the degree of cure achieved by heating the hardened foam to a temperature of 60° C. for at least 18 hours.

* * * * *

UNITED STATES PATENT AND TRADEMARK OFFICE
CERTIFICATE OF CORRECTION

PATENT NO. : 4,900,759
DATED : February 13, 1990
INVENTOR(S) : Clark et al

It is certified that error appears in the above-identified patent and that said Letters Patent is hereby corrected as shown below:

Column 16, Line 6 - Delete "rinsing" and insert --rising--.

Column 17, Table 6 at the * - Delete "100 - 1" and insert --100 - ln 1--.

Claim 8, Line 2 - Delete "7" and insert --11--.

Claim 10, Line 1 - Delete "10" and insert --9--.

Signed and Sealed this

Twenty-first Day of May, 1991

Attest:

HARRY F. MANBECK, JR.

Attesting Officer

Commissioner of Patents and Trademarks